(12) United States Patent
Chang

(10) Patent No.: US 10,187,922 B2
(45) Date of Patent: Jan. 22, 2019

(54) WIRELESS COMMUNICATION METHOD AND DEVICE

(71) Applicant: MediaTek Inc., Hsin-Chu (TW)

(72) Inventor: Chia-Wei Chang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 355 days.

(21) Appl. No.: 14/997,096

(22) Filed: Jan. 15, 2016

(65) Prior Publication Data

US 2016/0212792 A1 Jul. 21, 2016

Related U.S. Application Data

(60) Provisional application No. 62/104,256, filed on Jan. 16, 2015.

(51) Int. Cl.
| | | |
|---|---|---|
| *H04W 4/00* | (2018.01) | |
| *H04W 76/22* | (2018.01) | |
| *H04W 76/11* | (2018.01) | |
| *H04L 12/801* | (2013.01) | |
| *H04L 12/851* | (2013.01) | |

(52) U.S. Cl.
CPC ............. *H04W 76/22* (2018.02); *H04L 47/14* (2013.01); *H04L 47/24* (2013.01); *H04W 76/11* (2018.02)

(58) Field of Classification Search
USPC .......................... 370/252, 329, 393, 395, 330
See application file for complete search history.

(56) References Cited

U.S. PATENT DOCUMENTS

| | | | |
|---|---|---|---|
| 7,324,498 B2 | 1/2008 | Ahn et al. | |
| 7,385,946 B2 | 6/2008 | Devarapalli et al. | |
| 2004/0151155 A1* | 8/2004 | Jouppi ................ | H04W 76/022 370/349 |
| 2007/0266430 A1 | 11/2007 | Babbar et al. | |

FOREIGN PATENT DOCUMENTS

| | | |
|---|---|---|
| CN | 103618680 | 3/2014 |
| WO | WO 2003/007544 | 1/2003 |

OTHER PUBLICATIONS

Li, X., et al.; Research and implementation of TFT in EPS system; 2nd International Symposium on Instrumentation and Measurement, Sensor Network and Automation (IMSNA); 2013; pp. 968-971.

* cited by examiner

*Primary Examiner* — Zewdu A Beyen
(74) *Attorney, Agent, or Firm* — McClure, Qualey & Rodack, LLP

(57) ABSTRACT

A wireless communication method and device are provided. The wireless communication method includes the steps of receiving a Traffic Flow Template (TFT) which is assigned by a network; determining whether a first evaluation precedence index (EPI) corresponding to a new packet filter of the TFT is the same as a second EPI corresponding to an old packet filter which belongs to an evolved packet system (EPS) bearer or a packet data protocol (PDP) context; determining whether the new packet filter belongs to the EPS bearer or the PDP context when the first EPI is the same as the second EPI; and replacing the old packet filter with the new packet filter without deleting the EPS bearer or the PDP context when the new packet filter belongs to the EPS bearer or the PDP context.

16 Claims, 15 Drawing Sheets

WIRELESS COMMUNICATION METHOD AND DEVICE

CROSS REFERENCE TO RELATED APPLICATIONS

This application claims priority of U.S. Provisional Patent Application No. 62/104,256, filed on Jan. 16, 2015, the entirety of which is incorporated by reference herein.

BACKGROUND OF THE INVENTION

Field of the Invention

The invention generally relates to a wireless communication technology, and more particularly, to a wireless communication method for resolving the evaluation precedence index (EPI) conflict in an evolved packet system (EPS) bearer or packet data protocol (PDP) context without deleting this EPS bearer or PDP context.

Description of the Related Art

Wireless communication systems have been used widely to provide various telecommunication services such as telephony, video, data, messaging, and broadcast services. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on the municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lowering costs, improving services, making use of new spectrums, and integrating better with other open standards using OFDMA on downlinks (DL), and SC-FDMA on uplinks (UL) and multiple-input multiple-output (MIMO) antenna technology.

When data packets are transmitted, Traffic flow template (TFT) defines rules for data service with a specific quality of service treatment between user equipment (UE) and network. Therefore, when EPS bearer or PDP context provides Quality of Service (QoS) for special service or application, TFT may define rules so that UE and network knows which data packet (or IP packet) should be sent on particular EPS bearer or PDP context. Each rule describing how data packet is transmitted (e.g. protocol type, IP type, destination IP address, etc.) can be known as packet filter. Every packet filter has a locally unique identifier called packet filter identifier used to identify each packet filters within the same EPS bearer or PDP context, and another globally unique identifier called evaluation precedence index (EPI) used to identify packet filters across EPS bearer or PDP context within a packet data network (PDN) connection. The data packet will be classified according to the packet filters. During data packet classification, packet filters among all EPS bearers or PDP contexts within the same PDN are ordered by evaluation precedence indexes, and each data packet will be mapped to an EPS bearer or PDP context when it matches a packet filter. FIG. 1 is a schematic diagram illustrating the relationship between the PDN connection, EPS bearer/PDP context, TFT and packet filters. As shown in FIG. 1 a plurality of PDN connections (e.g. PDN connection#1 and PDN connection#2) may be established, and each of the PDN connection may correspond to one or more EPS bearers or PDP contexts (e.g. EPS bearer/PDP context #1 and EPS bearer/PDP context #2), wherein one PDN connection may have an Access Point Name (APN), an IP address, etc. and each EPS bearer corresponds to an EPS Bearer Identity (EBI) and an Quality of Service (QoS), and each PDP context corresponds a Network Layer Service Access Point Identifier (NSAPI) and an Quality of Service (QoS). Each of the TFT may define packet filters so that UE and network knows which data packet (or IP packet) should be sent on particular EPS bearer or PDP context, wherein each packet filter may have an EPI and packet filter content (e.g. protocol type, IP type, destination IP address, etc.). The EPS bearer is applied to a 4G network and the EPS bearer may be a default EPS bearer or a dedicated EPS bearer. The PDP context is applied to a 2/3G network and the PDP context may be a primary PDP context or a secondary PDP context. A default EPS bearer (or primary PDP context) is assigned when a PDN connection is established. That is to say, the default EPS bearer will exist until the PDN connection is disconnected. A dedicated EPS bearer (or secondary PDP context) is assigned for a particular service or application, such as VoIP service, video service, etc.

In 3GPP standard, it defines that when UE encounters EPI conflict (i.e. new packet filter and old packet filter has the same EPI) during EPS bearer or PDP context activation or modification, it shall accept the new packet filter setting from network. Then, after EPS bearer or PDP context activation or modification completes, the EPS bearer or PDP context where the original packet filter belongs should be deactivated. However, when EPI conflict occurs within the same EPS bearer or PDP context, it would cause the new packet filter setting becomes useless, since the original and the new packet filter belongs to the same EPS bearer or PDP context. Namely, the UE will soon initiate an EPS bearer or PDP context deactivation procedure to delete the EPS bearer or PDP context, after EPS bearer or PDP context activation or modification has completed. Note that, the scenario above for "EPI conflict within same EPS bearer or PDP context" only takes place when new packet filter identifier differs from every existing packet filters; namely, if new packet filter identifier matches any existing packet filter, it should be treated as a normal replacement of that existing packet filter, and should not be considered as EPI conflict.

Taking FIGS. 2A-2B for example, FIG. 2A is a schematic diagram illustrating an EPI conflict in a default EPS bearer (or primary PDP context) and FIG. 2B is a schematic diagram illustrating an EPI conflict in a dedicated EPS bearer (or secondary PDP context). As shown in FIG. 2A, there are a default EPS bearer (or primary PDP context) and a dedicated EPS bearer (or secondary PDP context) corresponding to a packet data network (PDN) connection. When the network assigns a packet filter #2 (EPI=X) which corresponds to the default EPS bearer to the UE, the packet filter #2 (EPI=X) will conflict with the existing packet filter #1 (EPI=X) of the default EPS bearer. Therefore, the UE will initiate an EPS bearer deactivation procedure for the default EPS bearer to delete the default EPS bearer (i.e. the PDN connection will be disconnected) because the default EPS bearer corresponds to the old packet filter #1 (EPI=X). As shown in FIG. 2B, there are a default EPS bearer (or primary PDP context) and a dedicated EPS bearer (or secondary PDP context) corresponding to a packet data network (PDN) connection. When the network assigns a packet filter #2 (EPI=Y) which corresponds to the dedicated EPS bearer to the UE, the packet filter #2 (EPI=Y) will conflict with the existing packet filter #1 (EPI=Y) of the dedicated EPS bearer. Therefore, the UE will initiate an EPS bearer deactivation procedure for the dedicated EPS bearer to delete the dedicated EPS bearer because the dedicated EPS bearer corresponds to the old packet filter #1 (EPI=Y).

Therefore, it would lead to the unexpected early termination of the data service, and even disconnection of whole PDN connection, if it occurs within a default EPS bearer or primary PDP context.

BRIEF SUMMARY OF THE INVENTION

A wireless communication method and device are provided to overcome the problems mentioned above.

An embodiment of the invention provides a wireless communication method. The wireless communication method comprises the steps of receiving a Traffic Flow Template (TFT) which is assigned by a network; determining whether a first evaluation precedence index (EPI) corresponding to a new packet filter of the TFT is the same as a second EPI corresponding to an old packet filter which belongs to an evolved packet system (EPS) bearer or a packet data protocol (PDP) context; determining whether the new packet filter belongs to the EPS bearer or the PDP context when the first EPI is the same as the second EPI; and replacing the old packet filter by the new packet filter without deleting the EPS bearer or the PDP context when the new packet filter belongs to the EPS bearer or the PDP context.

In some embodiments of the invention, the EPS bearer is applied to a 4G network and the PDP context is applied to a 2/3G network. In some embodiments of the invention, the wireless communication method further comprises the step determining whether the new TFT has a semantic error or a syntactic error.

An embodiment of the invention provides a wireless communication device. The wireless communication device comprises a processor. The processor is configured to receive a Traffic Flow Template (TFT) which is assigned by a network, determine whether a first evaluation precedence index (EPI) corresponding to a new packet filter of the TFT is the same as a second EPI corresponding to an old packet filter which belongs to an evolved packet system (EPS) bearer or a packet data protocol (PDP) context, determine whether the new packet filter belongs to the EPS bearer or the PDP context when the first EPI is the same as the second EPI, and replace the old packet filter with the new packet filter without deleting the EPS bearer or the PDP context when the new packet filter belongs to the EPS bearer or the PDP context.

In some embodiments of the invention, the EPS bearer is applied to a 4G network and the PDP context is applied to a 2/3G network. In some embodiments of the invention, the processor is further configured to determine whether the TFT has a semantic error or a syntactic error.

Other aspects and features of the invention will become apparent to those with ordinary skill in the art upon review of the following descriptions of specific embodiments of wireless communication methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
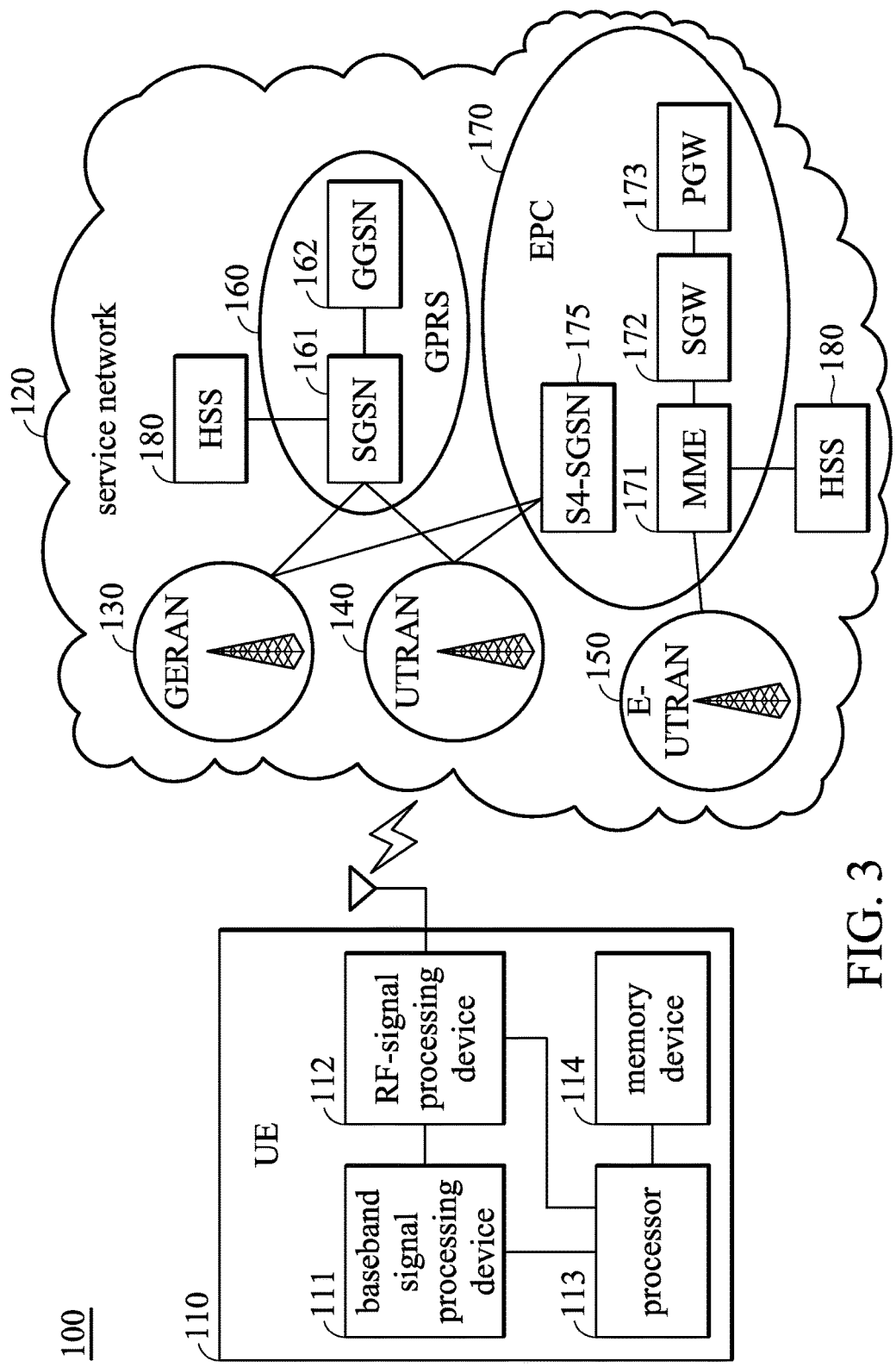
FIG. 3 is a block diagram of a mobile communications system 100 according to an embodiment of the invention.

FIG. 3 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc.

Figure 1:
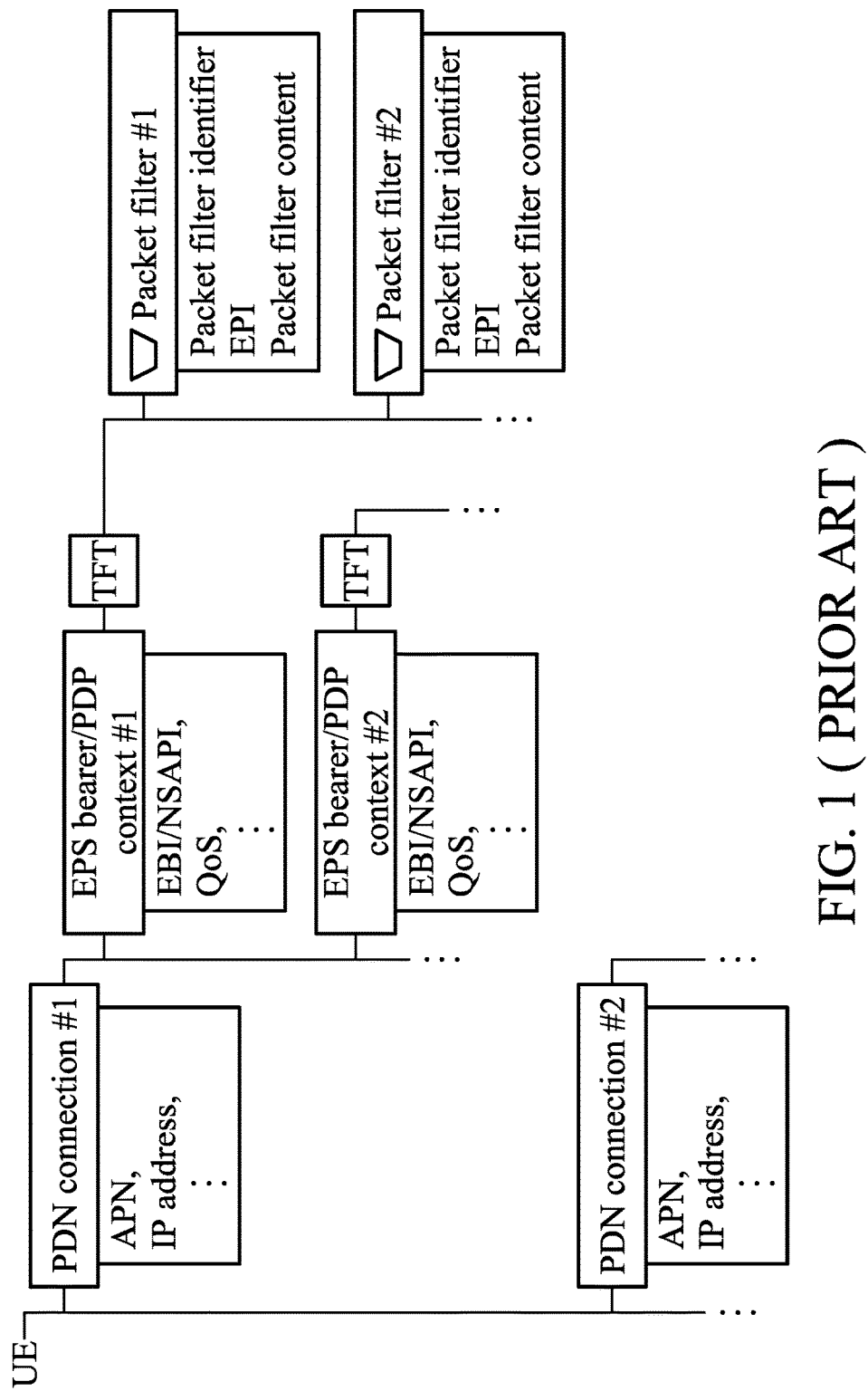
FIG. 1 is a schematic diagram illustrating the relationship between the PDN connection, EPS bearer/PDP context, TFT and packet filters.
Figure 2A:
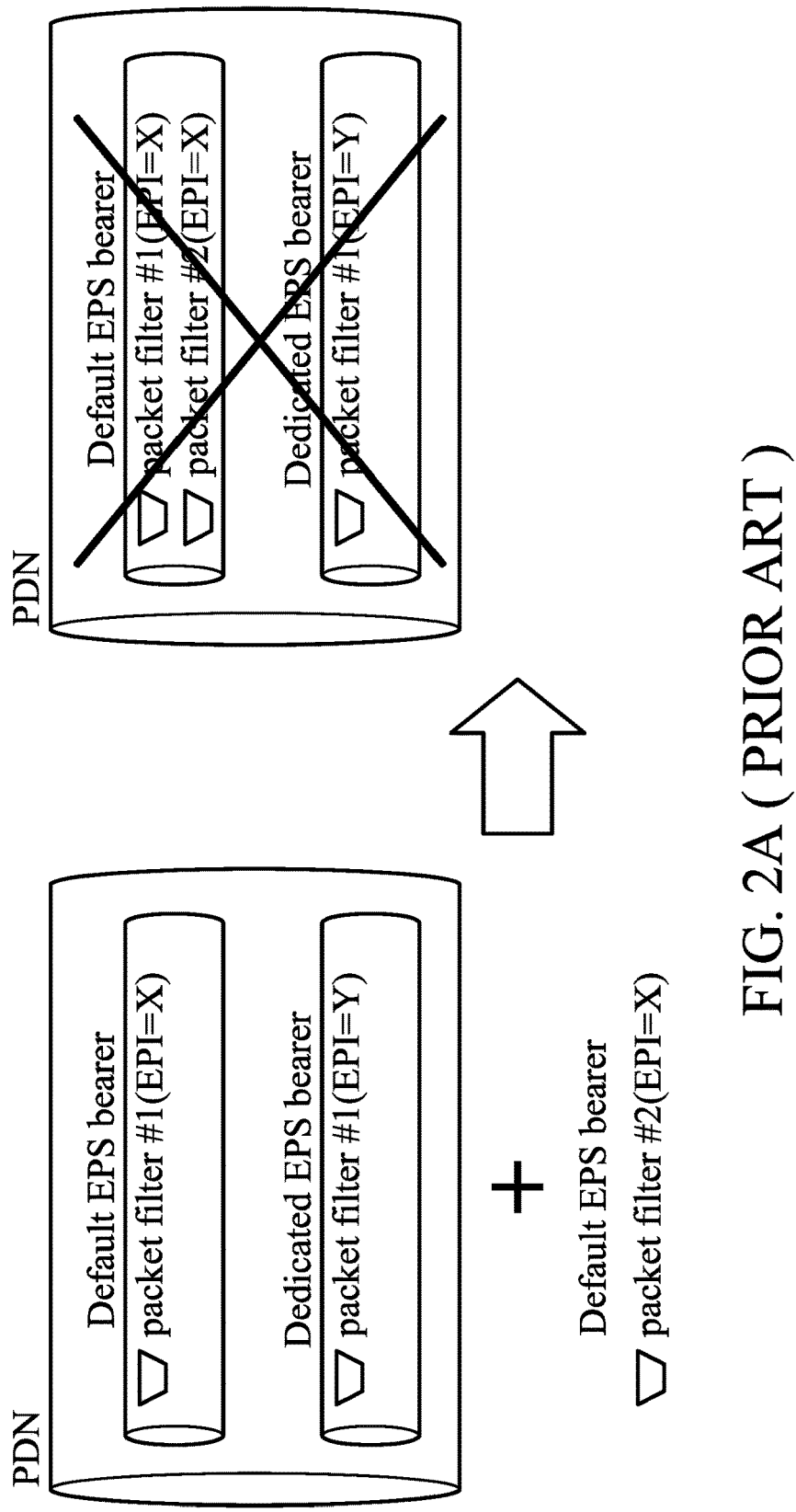
FIG. 2A is a schematic diagram illustrating an EPI conflict in a default EPS bearer (or primary PDP context)
Figure 2B:
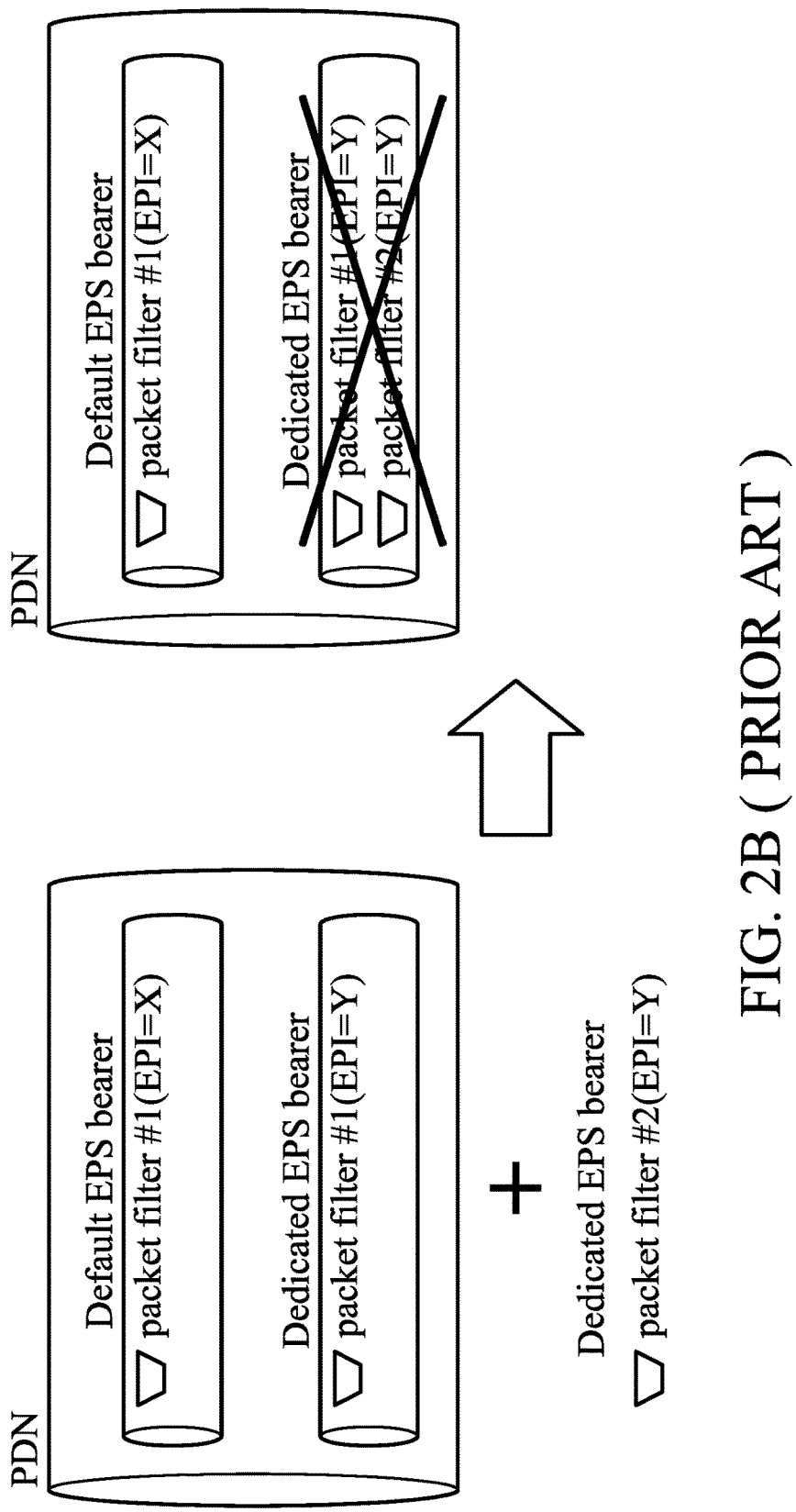
FIG. 2B is a schematic diagram illustrating an EPI conflict in a dedicated EPS bearer (or secondary PDP context)

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 3.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 3.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 3.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communication with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (or called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and interoperability with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communication with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may also include other functional entities, such as a Home Location Register (HLR) (not shown) which is a central database storing user-related and subscription-related information, and the invention is not limited thereto. In an embodiment of the invention, the service network 120 may also comprise a Code Division Multiple Access (CDMA) network.

In an embodiment of the invention, when the processor 113 receives a new Traffic Flow Template (TFT) which is assigned by the network 120, the processor 113 will determine whether the evaluation precedence index (EPI) conflict occurs. Namely, the processor 113 will determine whether an EPI (indicated as first EPI below) corresponding to a new packet filter indicated by the new TFT is the same as an existing EPI (indicated as second EPI below) corresponding to an old packet filter. In the embodiment of the invention, the TFT may be transmitted through an ACTIVATED DEDICATED EPS SEARER CONTEXT REQUEST, MODIFY EPS SEARER CONTEXT REQUEST, REQUEST SECONDARY PDP CONTEXT ACTIVATION, or MODIFY PDP CONTEXT REQUEST by the network 120. Note that, in the embodiments of the invention, only one new packet filter is described, but the invention should not be limited thereto. There may be a plurality of packet filters indicated by the new TFT.

For 4G network (e.g. E-UTRAN 150), the old packet filter belongs to an evolved packet system (EPS) bearer or packet data protocol (PDP) context, wherein the EPS bearer is a default EPS bearer or a dedicated EPS bearer. For 2/3G network (e.g. GERAN 130 and UTRAN 140), the old packet filter belongs to a PDP context, wherein the PDP context is a primary PDP context or a secondary PDP context.

When the processor 113 determines the EPI conflict occurs (i.e. the first EPI is the same as the second EPI), the processor 113 will determine whether the new packet filter belongs to the EPS bearer or the PDP context which the old packet filter belongs to. If the new packet filter belongs to the EPS bearer or the PDP context, i.e. the old packet filter and the new packet filter belongs to the same EPS bearer or PDP context, the processor 113 will only replace the old packet filter with the new packet filter without initiating an EPS bearer or PDP context deactivation procedure for the dedicated EPS bearer or PDP context to delete the EPS bearer or PDP context corresponding to the old packet filter when the new packet filter also belongs to the EPS bearer or the PDP context.

Figure 4A:
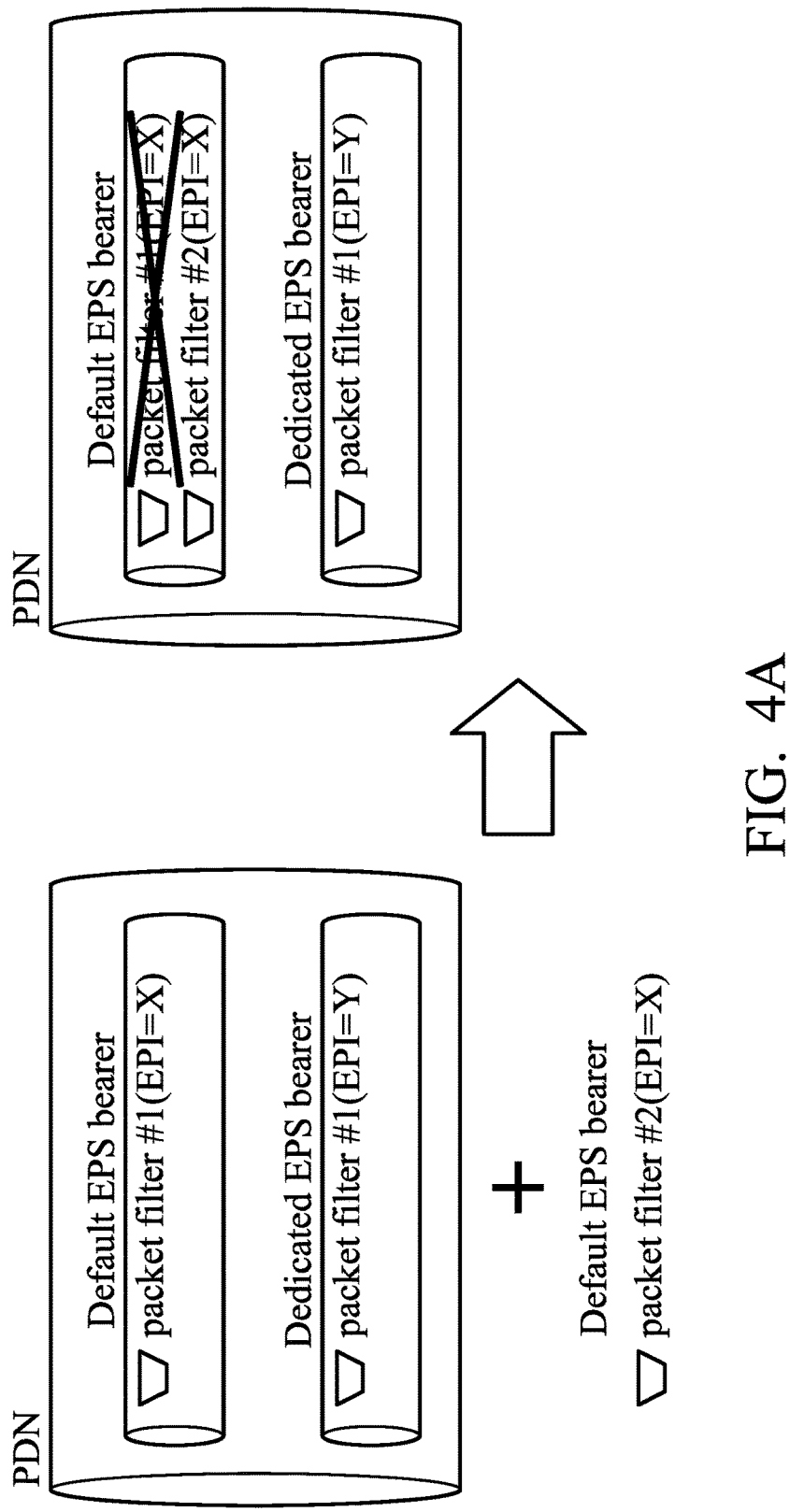
FIG. 4A is a schematic diagram illustrating an EPI conflict in a default EPS bearer according to an embodiment of the invention.

FIG. 4A is a schematic diagram illustrating an EPI conflict in a default EPS bearer according to an embodiment of the invention. As shown in FIG. 4A, there are a default EPS bearer and a dedicated EPS bearer corresponding to a packet data network (PDN) connection. When the network 120 assigns a packet filter #2 (EPI=X) which corresponds to the default EPS bearer, the packet filter #2 (EPI=X) will conflict with the existing packet filter #1 (EPI=X) of the default EPS bearer. Therefore, the processor 113 will only replace packet filter #1 (EPI=X) with packet filter #2 (EPI=X) without initiating an EPS bearer deactivation procedure for the default EPS bearer to delete the default EPS, wherein if the default EPS bearer is deleted, the PDN connection will be disconnected.

Figure 4B:
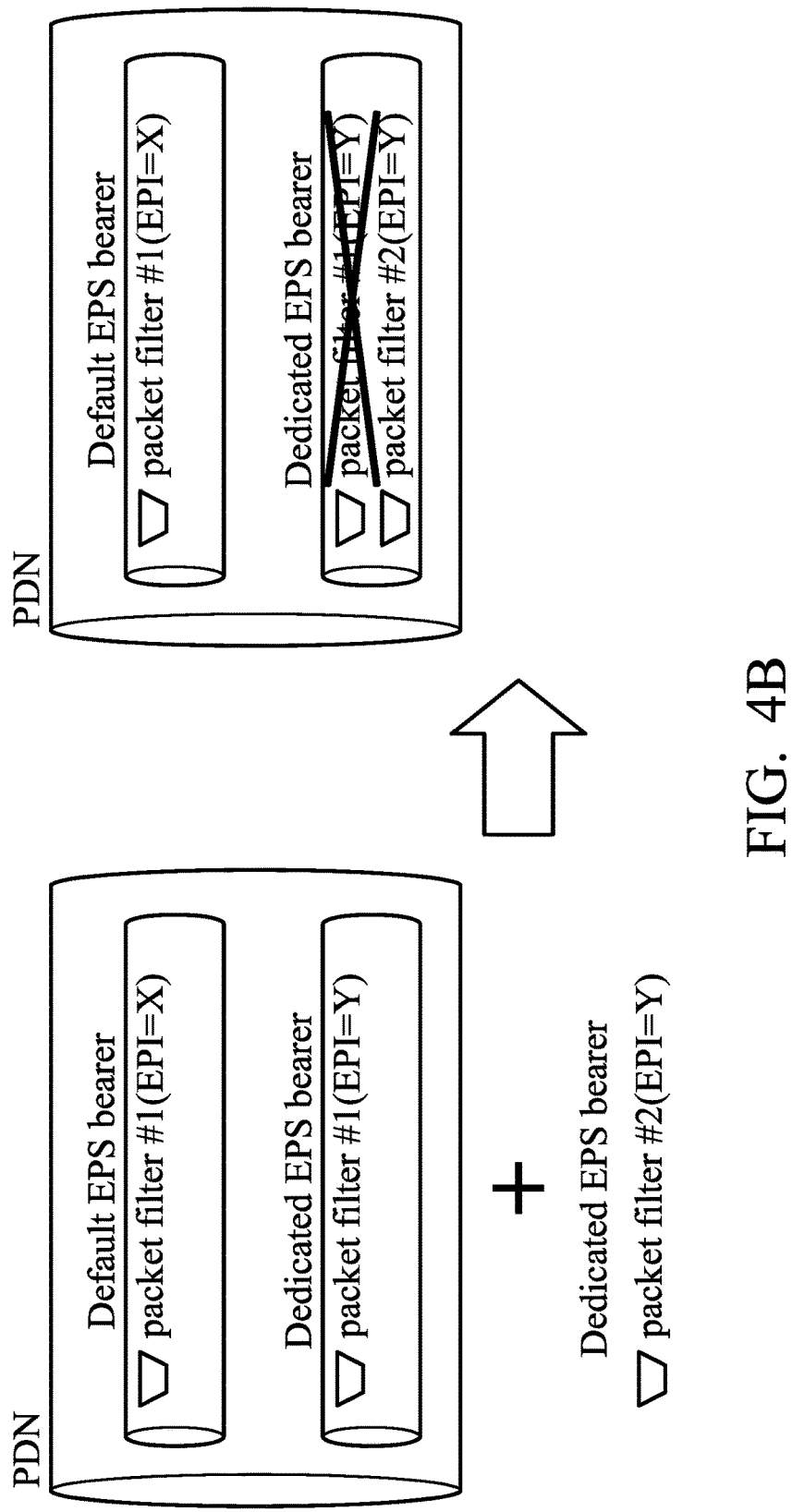
FIG. 4B is a schematic diagram illustrating an EPI conflict in a dedicated EPS bearer according to an embodiment of the invention.

FIG. 4B is a schematic diagram illustrating an EPI conflict in a dedicated EPS bearer according to an embodiment of the invention. As shown in FIG. 4B, there are a default EPS bearer and a dedicated EPS bearer corresponding to a packet data network (PDN) connection. When the network 120 assigns a packet filter #2 (EPI=Y) which corresponds to the dedicated EPS bearer, the packet filter #2 (EPI=Y) will conflict with the existing packet filter #1 (EPI=Y) of the dedicated EPS bearer. Therefore, the processor 113 will only replace packet filter #1 (EPI=Y) with packet filter #2 (EPI=Y) without initiating an EPS bearer deactivation procedure for the dedicated EPS bearer to delete the dedicated EPS bearer.

Figure 4C:
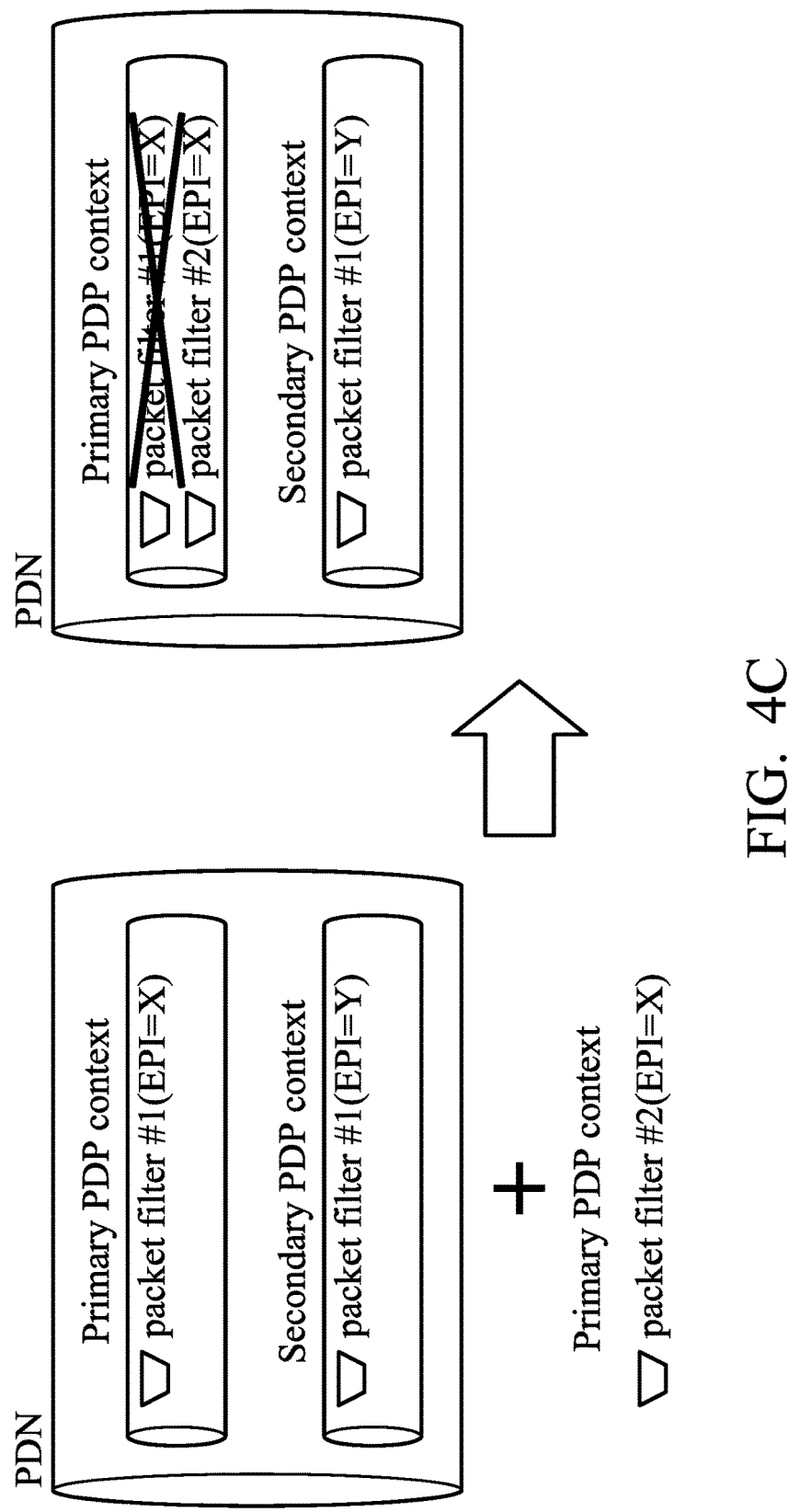
FIG. 4C is a schematic diagram illustrating an EPI conflict in a primary PDP context according to an embodiment of the invention.

FIG. 4C is a schematic diagram illustrating an EPI conflict in a primary PDP context according to an embodiment of the invention. As shown in FIG. 4C, there are a primary PDP context and a secondary PDP context corresponding to a packet data network (PDN) connection. When the network 120 assigns a packet filter #2 (EPI=X) which corresponds to the primary PDP context, the packet filter #2 (EPI=X) will conflict with the existing packet filter #1 (EPI=X) of the primary PDP context. Therefore, the processor 113 will only replace packet filter #1 (EPI=X) with packet filter #2 (EPI=X) without initiating an PDP context deactivation procedure for the primary PDP context to delete the primary PDP context, wherein if the primary PDP context is deleted, the PDN connection will be disconnected.

Figure 4D:
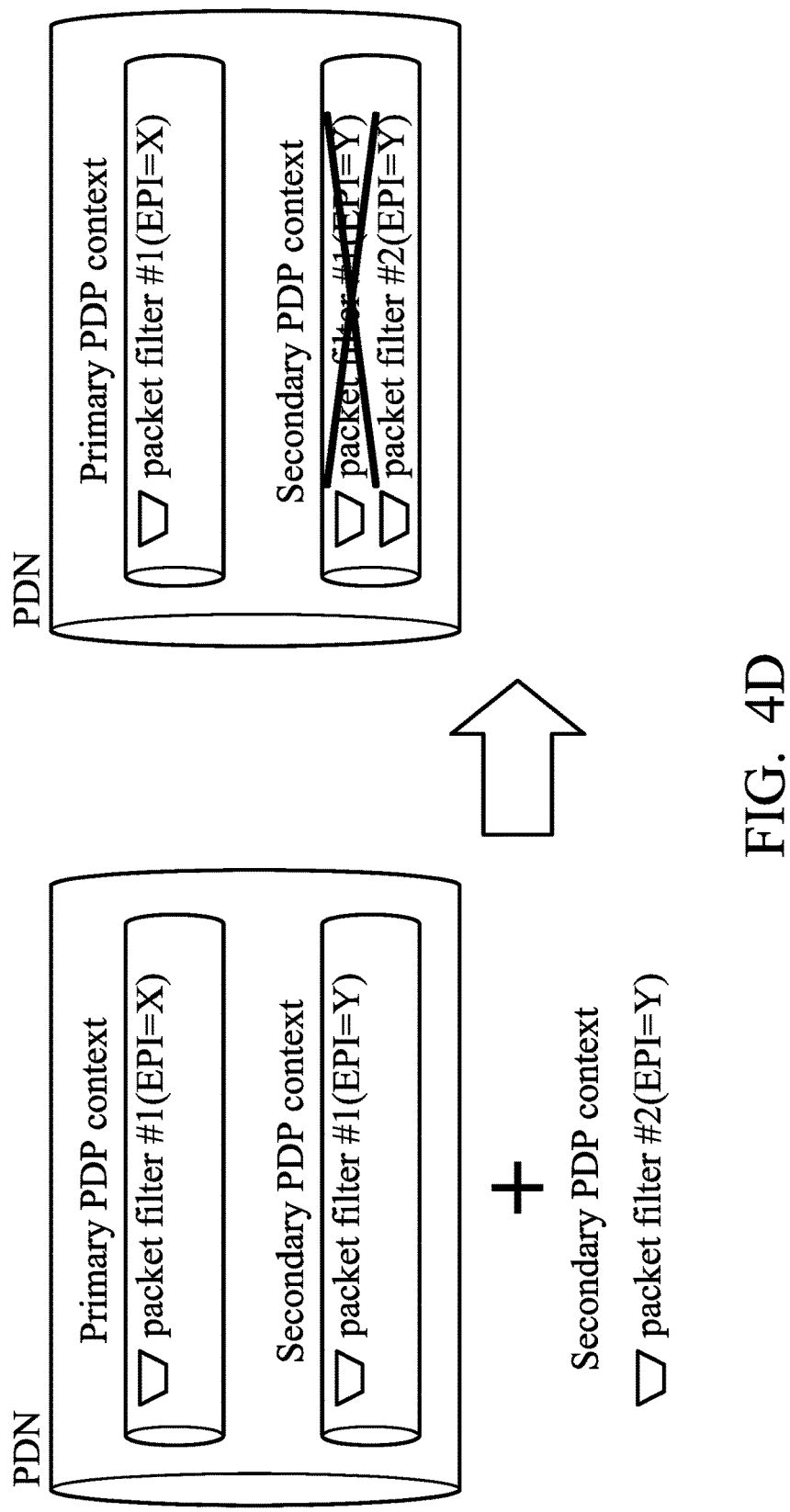
FIG. 4D is a schematic diagram illustrating an EPI conflict in a secondary PDP context according to an embodiment of the invention.

FIG. 4D is a schematic diagram illustrating an EPI conflict in a secondary PDP context according to an embodiment of the invention. As shown in FIG. 4D, there are a primary PDP context and a secondary PDP context corresponding to a packet data network (PDN) connection. When the network 120 assigns a packet filter #2 (EPI=Y) which corresponds to the secondary PDP context, the packet filter #2 (EPI=Y) will conflict with the existing packet filter #1 (EPI=Y) of the secondary PDP context. Therefore, the processor 113 will only replace packet filter #1 (EPI=Y) with packet filter #2 (EPI=Y) without initiating an PDP context deactivation procedure for the secondary PDP context to delete the secondary PDP context.

Figure 5A:
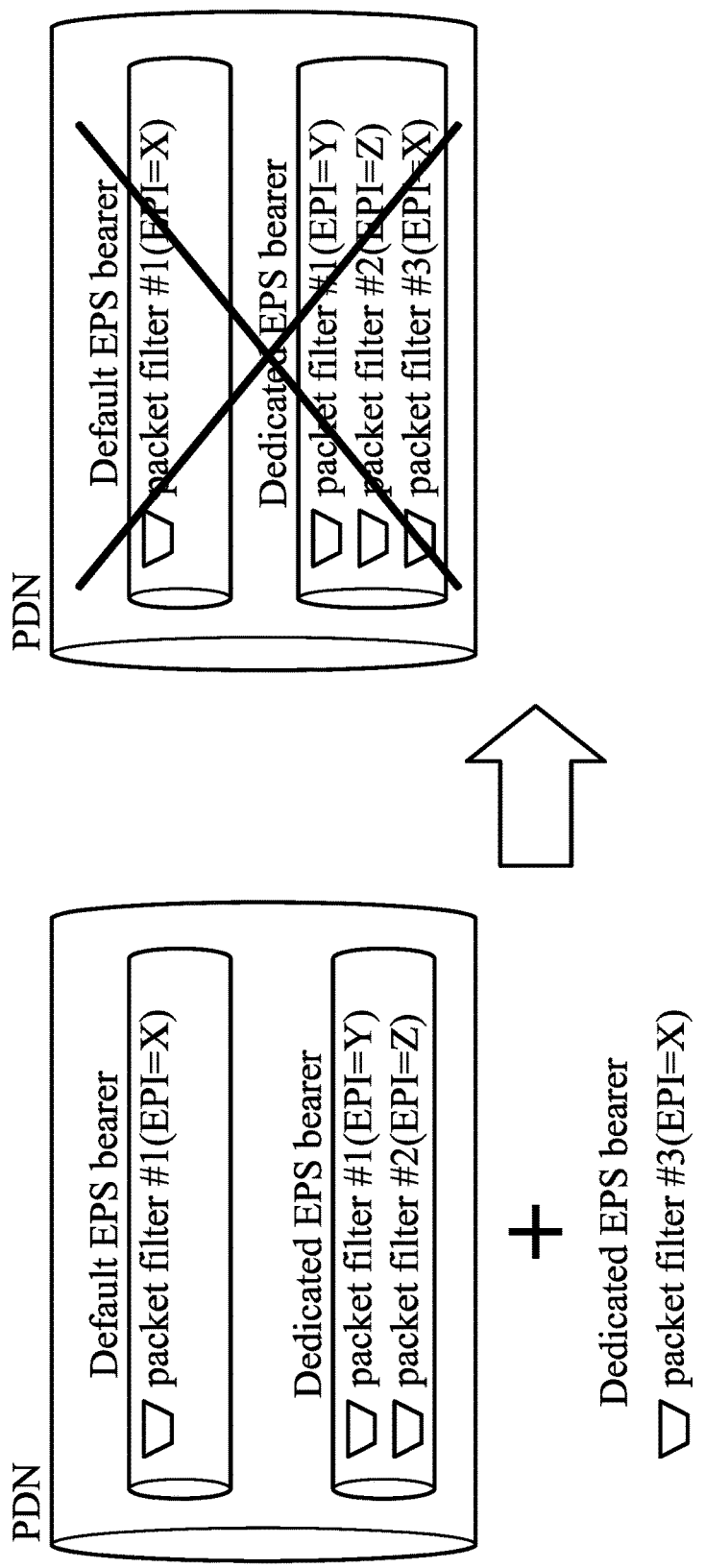
FIG. 5A is a schematic diagram illustrating an EPI conflict in different EPS bearers according to an embodiment of the invention.

In an embodiment of the invention, when the first EPI is the same as the second EPI, the old packet filter belongs to the default EPS bearer, and the new packet filter belongs to the dedicated EPS bearer, the processor 113 will initiate an EPS bearer deactivation procedure to delete the default EPS bearer to avoid the EPI conflict, i.e. the processor 113 will disconnect a packet data network (PDN) connection corresponding to the default EPS bearer. FIG. 5A is a schematic diagram illustrating an EPI conflict in different EPS bearers according to an embodiment of the invention. As shown in FIG. 5A, there are a default EPS bearer and a dedicated EPS bearer corresponding to a packet data network (PDN) connection. When the network 120 assigns a packet filter #3 (EPI=X) which corresponds to the dedicated EPS bearer, the packet filter #3 (EPI=X) will conflict with the existing packet filter #1 (EPI=X) of the default EPS bearer. Therefore, the processor 113 will initiate an EPS bearer deactivation procedure for the default EPS bearer corresponding to the old packet filter #1 (EPI=X) to delete the default EPS bearer, i.e. the PDN connection will be disconnected.

Figure 5B:
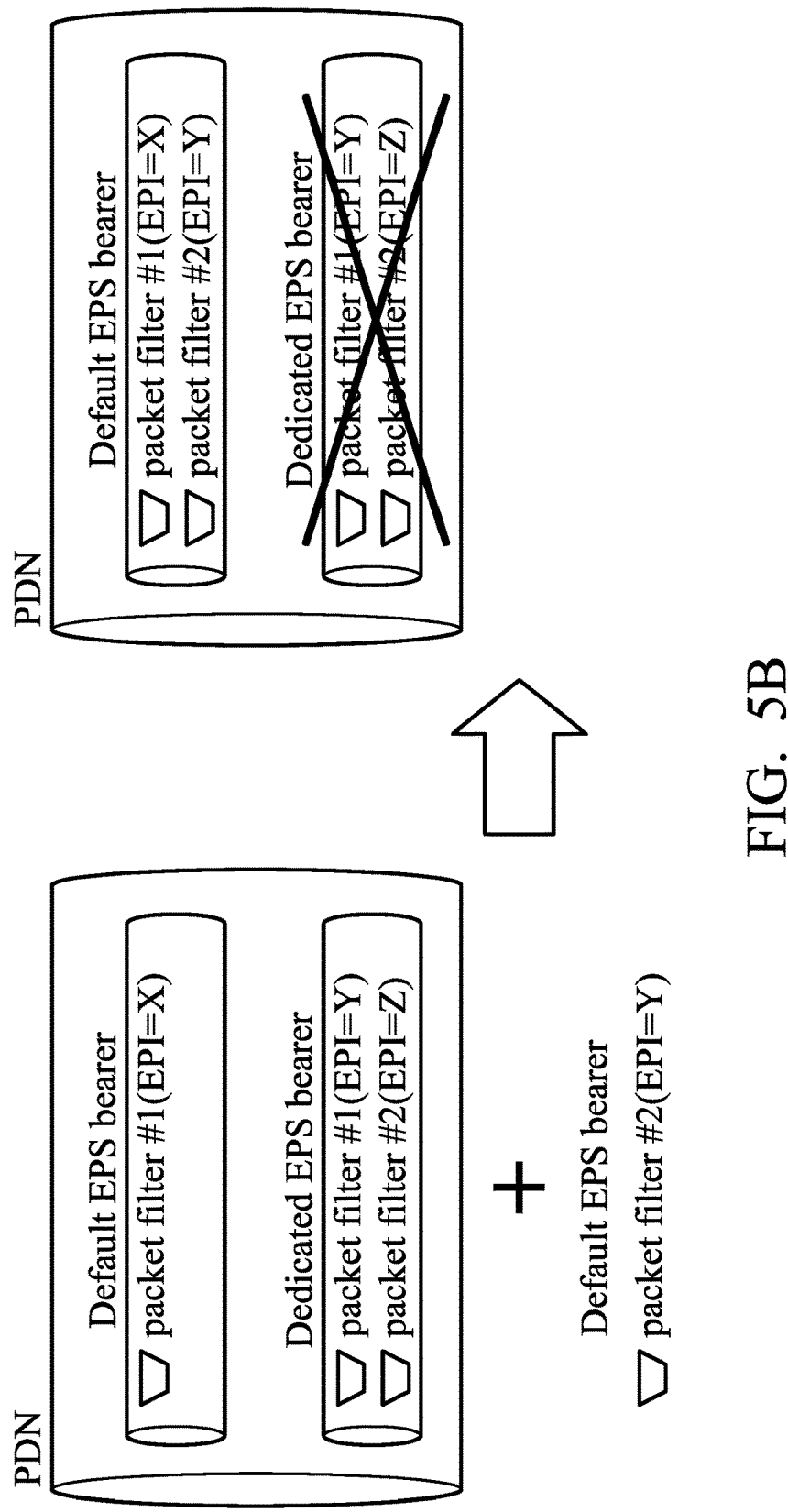
FIG. 5B is a schematic diagram illustrating an EPI conflict in different EPS bearers according to another embodiment of the invention.

In an embodiment of the invention, when the first EPI is the same as the second EPI, the old packet filter belongs to the dedicated EPS bearer, and the new packet filter belongs to the default EPS bearer, the processor 113 will initiate an EPS bearer deactivation procedure to delete the dedicated EPS bearer to avoid the EPI conflict. FIG. 5B is a schematic diagram illustrating an EPI conflict in different EPS bearers according to another embodiment of the invention. As shown in FIG. 5B, there are a default EPS bearer and a dedicated EPS bearer corresponding to a packet data network (PDN) connection. When the network 120 assigns a packet filter #2 (EPI=Y) which corresponds to the default EPS bearer, the packet filter #2 (EPI=Y) will conflict with the existing packet filter #1 (EPI=Y) of the dedicated EPS bearer. Therefore, the processor 113 will initiate an EPS bearer deactivation procedure for the default EPS bearer corresponding to the old packet filter #1 (EPI=Y) to delete the dedicated EPS bearer.

Figure 6A:
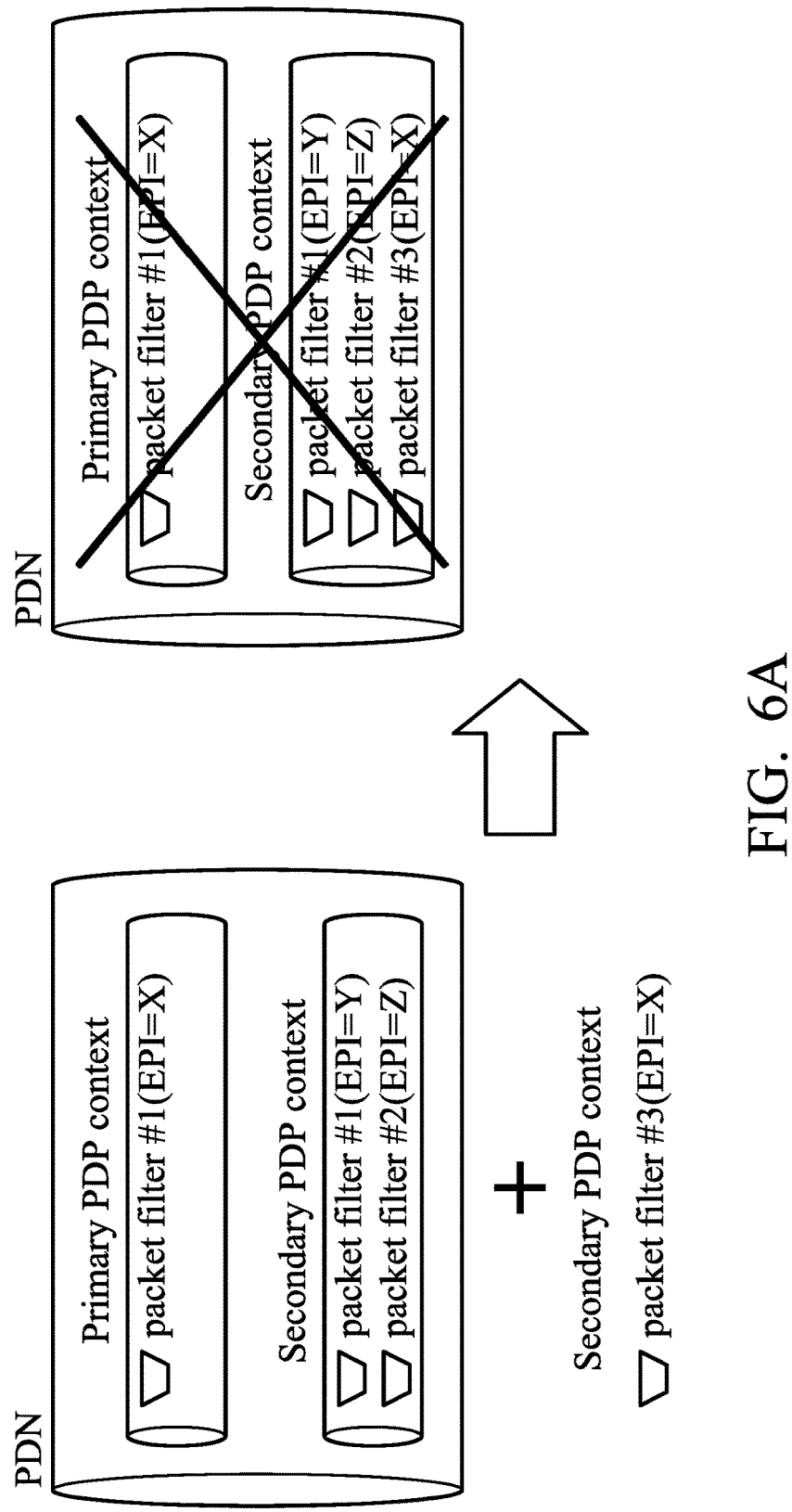
FIG. 6A is a schematic diagram illustrating an EPI conflict in different PDP contexts according to an embodiment of the invention.

In an embodiment of the invention, when the first EPI is the same as the second EPI, the old packet filter belongs to the primary PDP context, and the new packet filter belongs to the secondary PDP context, the processor 113 will initiate an PDP context deactivation procedure to delete the primary PDP context to avoid the EPI conflict, i.e. the processor 113 will disconnect a packet data network (PDN) connection corresponding to the primary PDP context. FIG. 6A is a schematic diagram illustrating an EPI conflict in different PDP contexts according to an embodiment of the invention. As shown in FIG. 6A, there are a primary PDP context and a secondary PDP context corresponding to a packet data network (PDN) connection. When the network 120 assigns a packet filter #3 (EPI=X) which corresponds to the secondary PDP context, the packet filter #3 (EPI=X) will conflict with the existing packet filter #1 (EPI=X) of the primary PDP context. Therefore, the processor 113 will initiate an PDP context deactivation procedure for the primary PDP context corresponding to the old packet filter #1 (EPI=X) to delete the primary PDP context, i.e. the PDN connection will be disconnected.

Figure 6B:
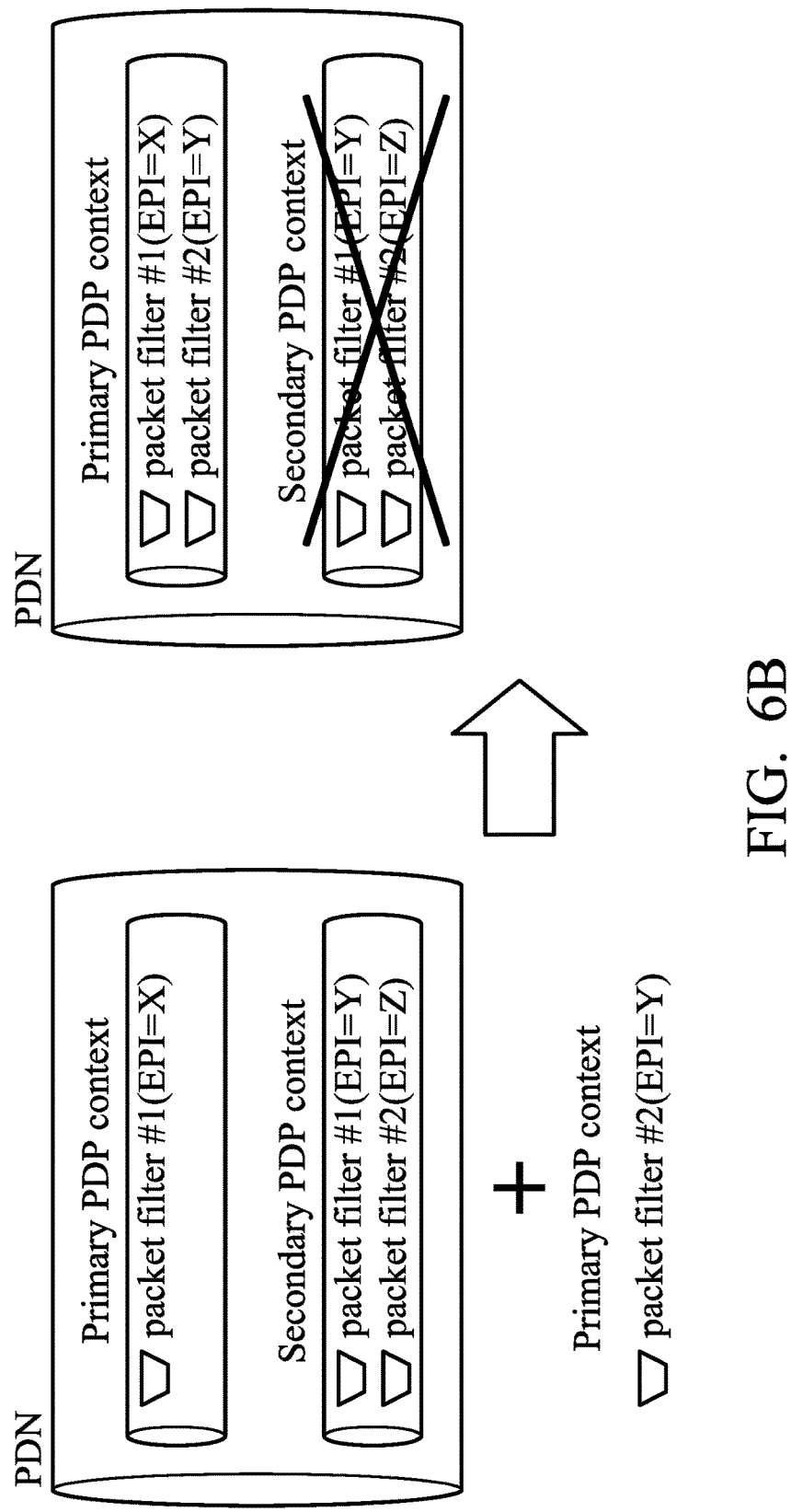
FIG. 6B is a schematic diagram illustrating an EPI conflict in different PDP contexts according to another embodiment of the invention.

In an embodiment of the invention, when the first EPI is the same as the second EPI, the old packet filter belongs to the secondary PDP context, and the new packet filter belongs to the primary PDP context, the processor 113 will initiate a PDP context deactivation procedure to delete the secondary PDP context to avoid the EPI conflict. FIG. 6B is a schematic diagram illustrating an EPI conflict in different PDP contexts according to another embodiment of the invention. As shown in FIG. 6B, there are a primary PDP context and a secondary PDP context corresponding to a packet data network (PDN) connection. When the network 120 assigns a packet filter #2 (EPI=Y) which corresponds to the primary PDP context, the packet filter #2 (EPI=Y) will conflict with the existing packet filter #1 (EPI=Y) of the secondary PDP context. Therefore, the processor 113 will initiate an EPS bearer deactivation procedure for the secondary PDP context corresponding to the old packet filter #1 (EPI=Y) to delete the secondary PDP context.

Figure 7A:
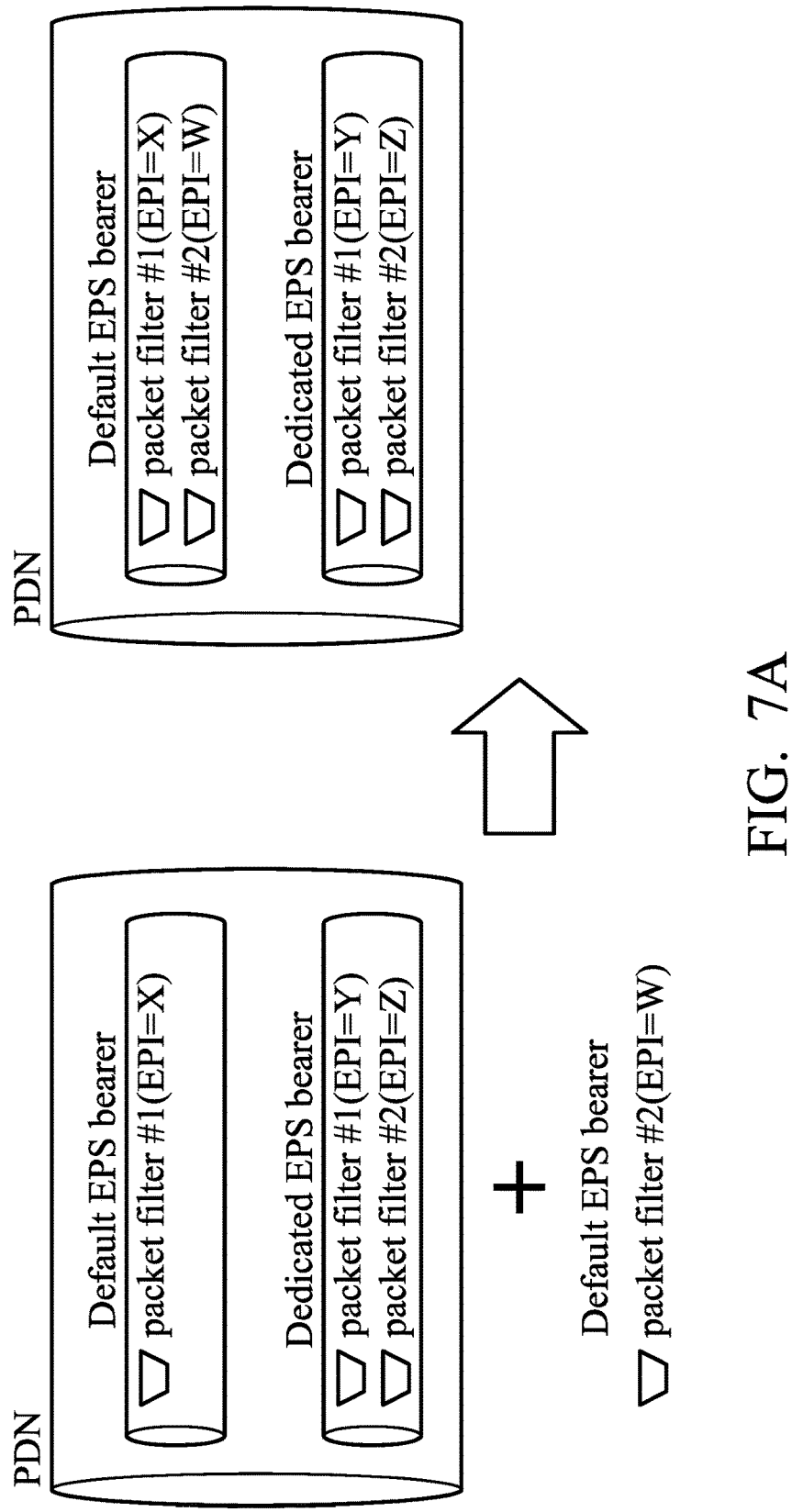
FIG. 7A is a schematic diagram illustrating no EPI conflict occurs according to an embodiment of the invention.
Figure 7B:
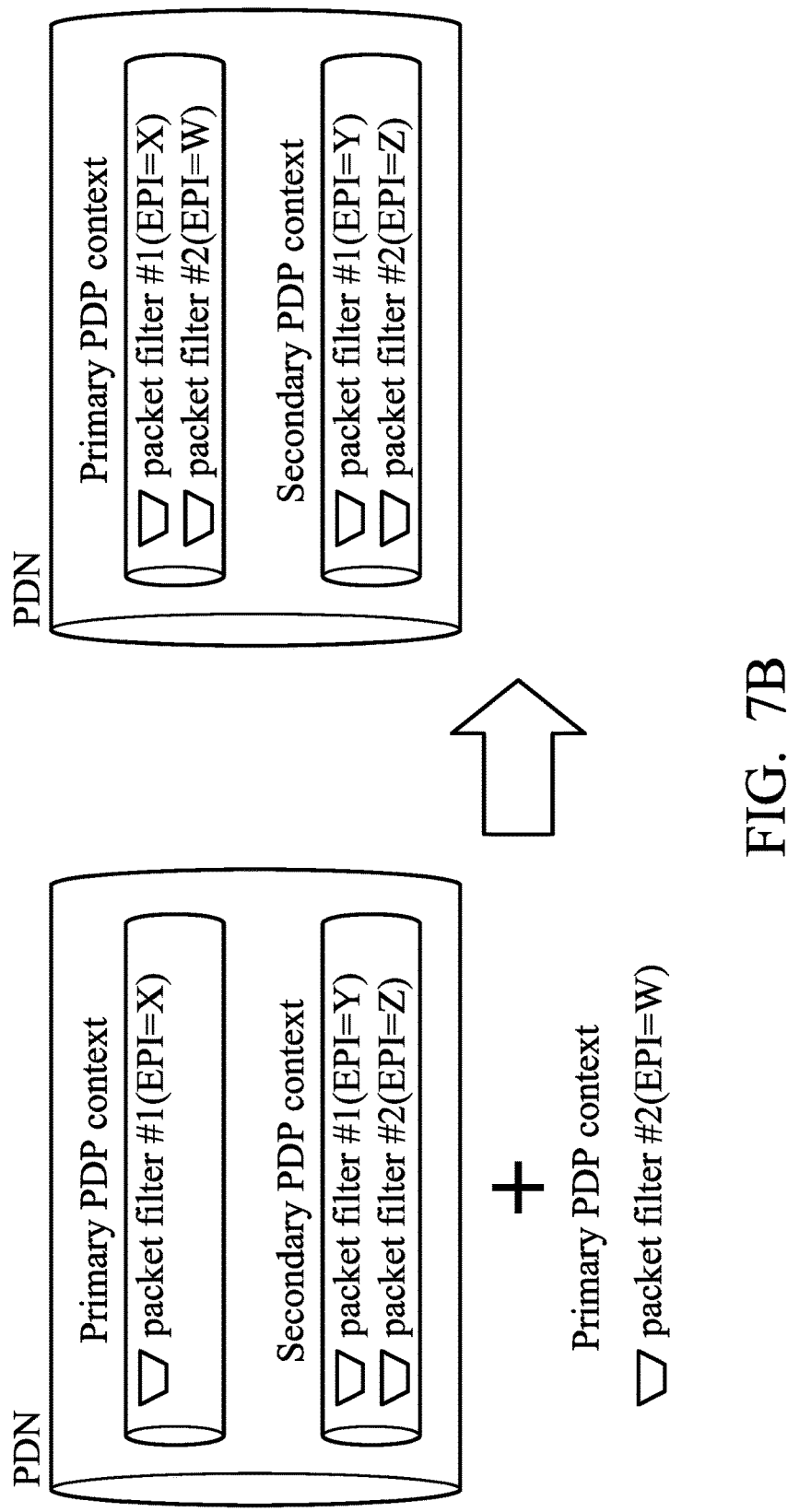
FIG. 7B is a schematic diagram illustrating no EPI conflict occurs according to an embodiment of the invention.

In an embodiment of the invention, when the first EPI is not the same as the second EPI (i.e. no EPI conflict), the processor 113 will assign the new packet filter to a corresponding EPS bearer or PDP context, wherein the corresponding EPS bearer or PDP context of the new packet filter is the same as or different from the EPS bearer or the PDP context corresponding to the old packet filter. FIG. 7A is a schematic diagram illustrating no EPI conflict occurs according to an embodiment of the invention. As shown in FIG. 7A, there are a default EPS bearer and a dedicated EPS bearer corresponding to a packet data network (PDN) connection. When the network 120 assigns a packet filter #2 (EPI=W) which corresponds to the default EPS bearer, the EPI conflict does not occur. Therefore, the processor 113 will assign the new packet filter #2 (EPI=W) to a corresponding EPS bearer (i.e. default EPS bearer). FIG. 7B is a schematic diagram illustrating no EPI conflict occurs according to another embodiment of the invention. As shown in FIG. 7B, there are a primary PDP context and a secondary PDP context corresponding to a packet data network (PDN) connection. When the network 120 assigns a packet filter #2 (EPI=W) which corresponds to the primary PDP context, the EPI conflict does not occur. Therefore, the processor 113 will assign the new packet filter #2 (EPI=W) to a corresponding EPS bearer (i.e. primary PDP context).

Note that FIGS. 4A~7B are only utilized to illustrate the embodiments of the invention, but the invention should not be limited thereto. In some embodiments of the invention, one of the PDN connections may correspond to only one default EPS bearer or primary bearer. In some embodiments of the invention, one of the PDN connections may correspond to one default EPS bearer or primary bearer and a plurality of dedicated EPS bearers or secondary PDP contexts. In some embodiments of the invention, the default EPS bearer or primary bearer may not correspond to any packet filter. In some embodiments of the invention, the EPS bearer or PDP context may correspond to more packet filters than just the packet filters shown in FIGS. 4A~7B.

In an embodiment of the invention, before determining whether the EPI conflict occurs, the processor 113 may determine whether the new TFT has a semantic error or a syntactic error. If the new TFT has a semantic error or a syntactic error, the processor 113 will reject the settings of the TFT. If the new TFT does not have a semantic error or a syntactic error, the processor 113 will determine whether an EPI conflict occurs.

Figure 8:
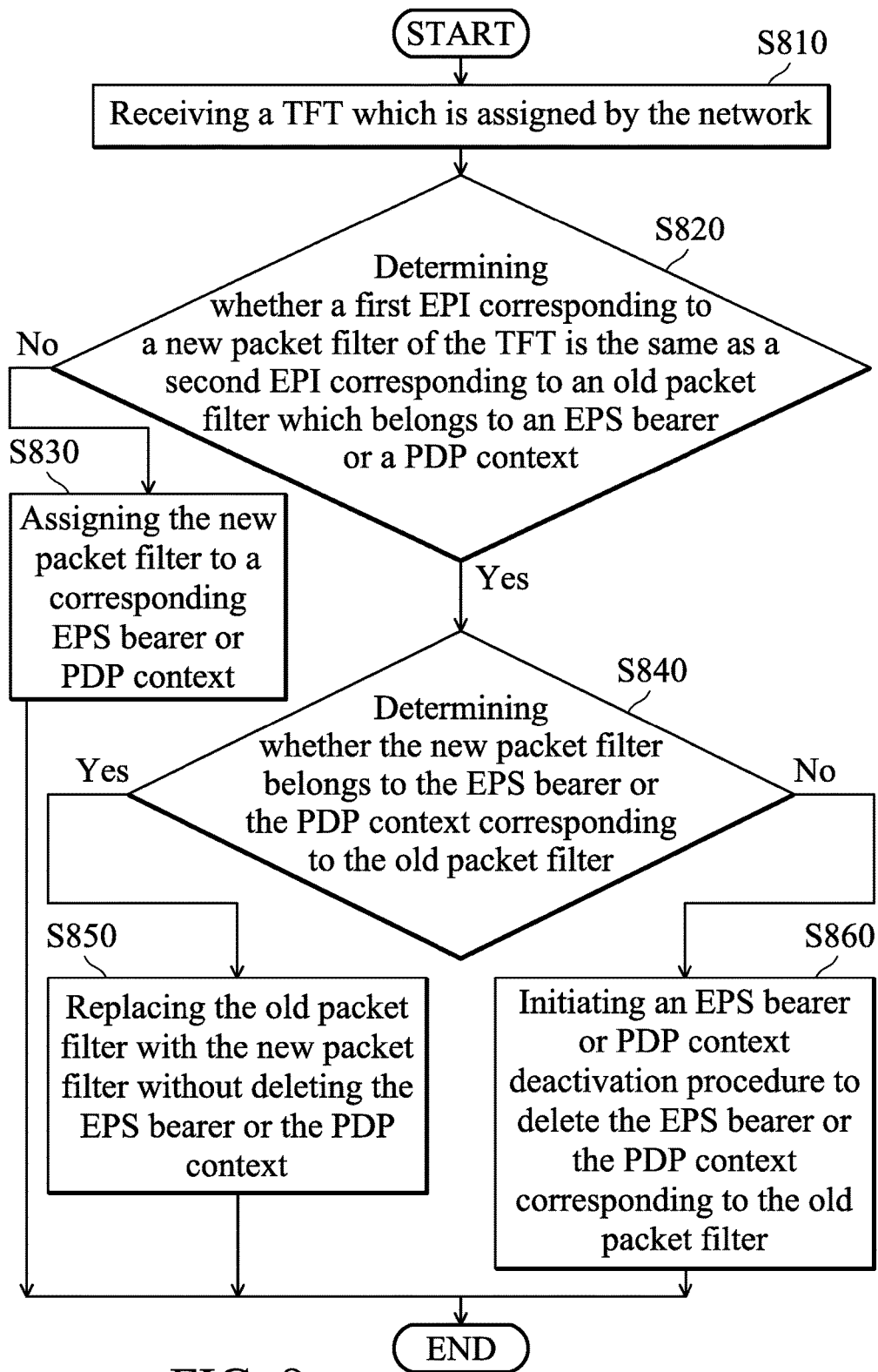
FIG. 8 is a flow chart illustrating the wireless communication method according to an embodiment of the invention.

FIG. 8 is a flow chart illustrating the wireless communication method according to an embodiment of the invention. The wireless communication method is applied to the UE 110. First, in step S810, the UE 110 receives a Traffic Flow Template (TFT) which is assigned by the network 120. In step S820, the UE 110 will determine whether a first EPI corresponding to a new packet filter of the TFT is the same as a second EPI corresponding to an old packet filter which belongs to an EPS bearer or a PDP context. When the first EPI is not the same as the second EPI (i.e. the EPI conflict does not occur), step S830 will be performed. In step S830, the UE 110 will assign the new packet filter to a corresponding EPS bearer or PDP context, wherein the corresponding EPS bearer or PDP context of the new packet filter is the same as or different from the EPS bearer or the PDP context corresponding to the old packet filter.

When the first EPI is the same as the second EPI (i.e. the EPI conflict occurs), step S840 will be performed. In step S840, the UE 110 will determine whether the new packet filter belongs to the EPS bearer or the PDP context corresponding to the old packet filter. When the new packet filter belongs to the EPS bearer or the PDP context corresponding to the old packet filter, step S850 will be performed. In step S850, the UE 110 will only replace the old packet filter with the new packet filter without deleting the EPS bearer or the PDP context. When the new packet filter does not belong to the EPS bearer or the PDP context corresponding to the old packet filter, step S860 will be performed. In step S860, the UE 110 will initiate an EPS bearer or PDP context deactivation procedure to delete the EPS bearer or the PDP context corresponding to the old packet filter.

In an embodiment of the invention, if the old packet filter belongs to the default EPS bearer, and the new packet filter belongs to the dedicated EPS bearer, in step S860, the UE 110 will initiate an EPS bearer deactivation procedure to delete the default EPS bearer to avoid the EPI conflict, i.e. the UE 110 will disconnect a PDN connection corresponding to the default EPS bearer. In another embodiment of the invention, if the old packet filter belongs to the dedicated EPS bearer, and the new packet filter belongs to the default EPS bearer, in step S860, the UE 110 will initiate an EPS bearer deactivation procedure to delete the dedicated EPS bearer to avoid the EPI conflict.

In an embodiment of the invention, if the old packet filter belongs to the primary PDP context, and the new packet filter belongs to the secondary PDP context, in step S860, the UE 110 will initiate an PDP context deactivation procedure to delete the primary PDP context to avoid the EPI conflict, i.e. the UE 110 will disconnect a PDN connection corresponding to the primary PDP context. In another embodiment of the invention, if the old packet filter belongs to the secondary PDP context, and the new packet filter belongs to the primary PDP context, in step S860, the UE 110 will initiate an PDP context deactivation procedure to delete the secondary PDP context to avoid the EPI conflict.

In an embodiment of the invention, the UE 110 may determine whether the new packet filter has a semantic error or a syntactic error before step S820. If the new TFT has a semantic error or a syntactic error, the UE 110 will reject the settings of the TFT. If the new TFT does not have a semantic error or a syntactic error, the UE 110 will determine whether an EPI conflict occurs.

In the wireless communication method of the invention, when an EPI conflict occurs in an EPS bearer or PDP context, the UE only needs to replace the old packet filter with the new packet filter without deleting the EPS bearer or the PDP context corresponding to old packet filter. Therefore, when the EPI conflict occurs in an EPS bearer or PDP context, the wireless communication method of the invention avoids the unexpected termination of data service, and avoids the disconnection of whole PDN connection if the EPI conflict occurs within a default EPS bearer or primary PDP context.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method, comprising:
   receiving, by a processor of a wireless communication device, a Traffic Flow Template (TFT) which is assigned by a network;
   determining, by the processor, whether a first evaluation precedence index (EPI) corresponding to a new packet filter of the TFT is the same as a second EPI corresponding to an old packet filter which belongs to an evolved packet system (EPS) bearer or a packet data protocol (PDP) context;
   determining, by the processor, whether the new packet filter belongs to the EPS bearer or the PDP context when the first EPI is the same as the second EPI; and
   replacing, by the processor, the old packet filter by the new packet filter without deleting the EPS bearer or the PDP context when the new packet filter belongs to the EPS bearer or the PDP context,
   wherein the PDP context is a primary PDP context or a secondary PDP context,
   wherein when the PDP context is the primary PDP context, the wireless communication method further comprises: initiating an PDP context deactivation procedure to disconnect a packet data network (PDN) connection corresponding to the primary PDP context when the first EPI is the same as the second EPI and the new packet filter belongs to the secondary PDP context.

2. The wireless communication method of claim 1, wherein the EPS bearer is applied to a 4G network and the PDP context is applied to a 2/3G network.

3. The wireless communication method of claim 2, wherein the EPS bearer is a default EPS bearer or a dedicated EPS bearer.

4. The wireless communication method of claim 3, wherein when the EPS bearer is the default EPS bearer, the wireless communication method further comprises:
   initiating an EPS bearer deactivation procedure to disconnecting a packet data network (PDN) connection corresponding to the default EPS bearer when the first EPI is the same as the second EPI and the new packet filter belongs to the dedicated EPS bearer.

5. The wireless communication method of claim 3, wherein when the EPS bearer is the dedicated EPS bearer, the wireless communication method further comprises:
   initiating an EPS bearer deactivation procedure to delete the dedicated EPS bearer when the first EPI is the same as the second EPI and the new packet filter belongs to the default EPS bearer or another dedicated EPS bearer.

6. The wireless communication method of claim 1, wherein when the PDP context is the secondary PDP context, the wireless communication method further comprises:
   initiating a PDP context deactivation procedure to delete the secondary PDP context when the first EPI is the same as the second EPI and the new packet filter belongs to the primary PDP context and another secondary PDP.

7. The wireless communication method of claim 2, further comprising:
   assigning the new packet filter to a corresponding EPS bearer or PDP context when the first EPI is not the same as the second EPI, wherein the corresponding EPS bearer or PDP context is the same as or different from the EPS bearer or the PDP context.

8. The wireless communication method of claim 1, further comprising:
   determining whether the new TFT has a semantic error or a syntactic error.

9. A wireless communication device, comprising:
   a processor, configured to receive a Traffic Flow Template (TFT) which is assigned by a network, determine whether a first evaluation precedence index (EPI) corresponding to a new packet filter of the TFT is the same as a second EPI corresponding to an old packet filter which belongs to an evolved packet system (EPS) bearer or a packet data protocol (PDP) context, determine whether the new packet filter belongs to the EPS bearer or the PDP context when the first EPI is the same as the second EPI, and replace the old packet filter with the new packet filter without deleting the EPS bearer or the PDP context when the new packet filter belongs to the EPS bearer or the PDP context, wherein the PDP context is a primary PDP context or a secondary PDP context, wherein when the PDP context is the primary PDP context, the processor is further configured to initiate an PDP context deactivation procedure to disconnect a packet data network (PDN) connection corresponding to the primary PDP context when the first EPI is the same as the second EPI and the new packet filter belongs to the secondary PDP context.

10. The wireless communication device of claim 9, wherein the EPS bearer is applied to a 4G network and the PDP context is applied to a 2/3G network.

11. The wireless communication device of claim 10, wherein the EPS bearer is a default EPS bearer or a dedicated EPS bearer.

12. The wireless communication device of claim 11, wherein if the EPS bearer is the default EPS bearer, the processor is further configured to initiate an EPS bearer deactivation procedure to disconnect a packet data network (PDN) connection corresponding to the default EPS bearer when the first EPI is the same as the second EPI and the new packet filter belongs to the dedicated EPS bearer.

13. The wireless communication device of claim 11, wherein if the EPS bearer is the dedicated EPS bearer, the processor is further configured to initiate an EPS bearer deactivation procedure to delete the dedicated EPS bearer when the first EPI is the same as the second EPI and the new packet filter belongs to the default EPS bearer or another dedicated EPS bearer.

14. The wireless communication device of claim 9, wherein when the PDP context is the secondary PDP context, the processor is further configured to initiate an PDP context deactivation procedure to delete the secondary PDP context when the first EPI is the same as the second EPI and the new packet filter belongs to the primary PDP context and another secondary PDP.

15. The wireless communication device of claim 10, wherein the processor is further configured to assign the new packet filter to a corresponding EPS bearer or PDP context when the first EPI is not the same as the second EPI, wherein the corresponding EPS bearer or PDP context is the same as or different from the EPS bearer or the PDP context.

16. The wireless communication device of claim 9, wherein the processor is further configured to determine whether the TFT has a semantic error or a syntactic error.

* * * * *